W. EASTWOOD.
MEASURING INSTRUMENT.
APPLICATION FILED JULY 23, 1918.

1,322,770.

Patented Nov. 25, 1919.

Inventor
William Eastwood
by Herbert W. Jenner.
Attorney

UNITED STATES PATENT OFFICE.

WILLIAM EASTWOOD, OF LEEDS, ENGLAND.

MEASURING INSTRUMENT.

1,322,770.	Specification of Letters Patent.	Patented Nov. 25, 1919.

Application filed July 23, 1918. Serial No. 246,276.

*To all whom it may concern:*

Be it known that I, WILLIAM EASTWOOD, a subject of King George V of Great Britain, residing at Stanningley, Leeds, in the county of York, England, have invented new and useful Improvements in Measuring Instruments, of which the following is a specification.

This invention relates to watches or like instruments such as aneroid barometers, and has for its object the combination with same of a circular logarithmic slide rule or calculator whereby a single instrument is provided which while serving as an ordinary watch or the like, admits of the use thereof for calculating purposes.

Circular logarithmic slide rules of known construction are of two classes, namely:—

(*a*) those in which two concentric logarithmic scales are movable relatively to each other and are ordinarily provided with a cursor or the like, one of the scales in some instances having an equally spaced non-logarithmic scale thereon, and (*b*) those in which one movable logarithmic scale is used along with a stationary pointer and a cursor, the scale often being also provided with an equally divided non-logarithmic scale.

My invention consists in applying to a watch or other portable instrument such as a pedometer, voltmeter, or aneroid barometer, to form a combined part thereof, parts to form a circular logarithmic slide rule adapted to be used for the general class of calculations for which the usual pocket circular slide rules above mentioned or ordinary pocket slide rules are employed.

The object and nature of the invention thus set forth will appear more fully from the accompanying description and drawings and will be particularly pointed out in the claims.

Figure 1:
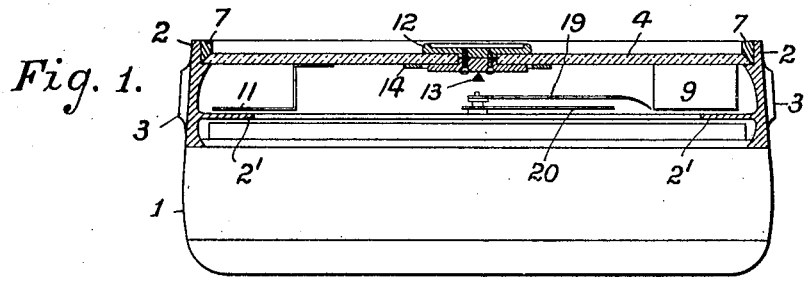
Figure 1 is an edge view, partly in section, of one form of application of the invention to a watch.
Figure 2:
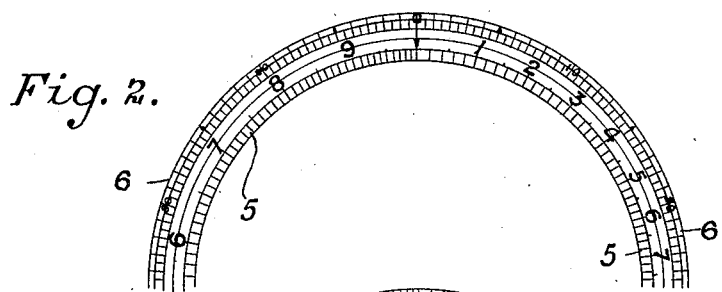
Fig. 2 is a partial plan view of a circular logarithmic scale and a concentric equally divided scale, the use of which parts are hereinafter described.
Figure 3:
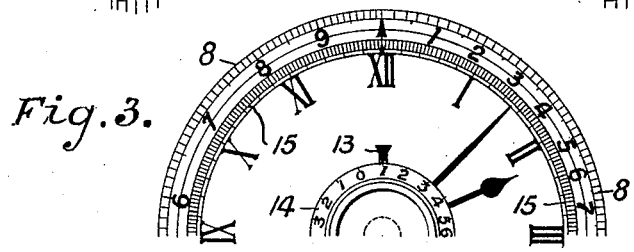
Fig. 3 is a partial plan view of a watch face having combined therewith an outer circular and concentric logarithmic scale.

Referring firstly to the embodiment of my invention shown in Figs. 1, 2 and 3, the case 1 of a watch is provided with a revoluble bezel 2 in which a glass 4 is revolubly carried the said glass being retained in position by a split ring 7. A shelf 2' on the bezel 2 carries a logarithmic scale 5 and an equally spaced scale 6, the scales 5 and 6 being shown in plan in Fig. 2. The bezel 2 is formed with a slight internal bevel so that it will be retained when sprung over a corresponding ridge on the watch case in the usual manner, but will still be free to revolve without shaking. Milling 3 is formed in the bezel to facilitate its rotation.

The glass 4 carries a lens 9 with a radial cursor line marked on it, and said glass also carries a wire cursor or pointer 11 for alternative use instead of the lens 9, or for use in conjunction with it. Instead of the pointer 11, there may be provided a flat piece of glass attached to the glass 4 with a cursor line on it, as close to the scales 5 and 6 as possible, so as to avoid parallax. In the center of the glass 4 is a revoluble button 12 carrying a finger 13 which, as shown in Fig. 3, protrudes beyond a scale 14, which said scale 14 is itself attached to the glass 4 and is independent of the finger 13. As an alternative to fixing the lens 9 and pointer 11 or substitute to the glass 4, the finger 13 suitably lengthened may be used to carry them, in which case the glass 4 need not be revoluble and the scale 14 would be dispensed with. Another alternative would be to fix the glass 4 and provide a finger to carry the cursor glass or lens or pointer, such finger being mounted on a central pivot on the watch independent of the glass, which said finger may be moved by means of a knob and suitable gears.

14 is a digit scale carried by the glass and which may be used in conjunction with the finger 13 to determine the position of the decimal point. In the last mentioned alternative construction, that is to say in which the glass is fixed and a cursor glass carried by a movable finger, the digit scale 14 and finger 13 may be retained or not, as may be preferred.

In Fig. 2, the logarithmic scale 5 and equally divided scale 6 are shown in plan, the circle of the latter being divided into 100 parts and subdivisions. If the decimal point be placed before the divisions of scale 6, they will give the logarithms of the numbers up to 10 of the figures on the logarithmic scale 5. Thus, the logarithm of 6 is .778; of 8 it is .903 and so on.

Fig. 3 shows a logarithmic scale 8 corresponding with the scale 5, and the minute circle 15 of an ordinary watch, each minute being subdivided into fifths of a minute. By means of this scale logarithms can be obtained in the following manner:—7 on scale 8 corresponds to 50.7 minutes of scale 15, and 50.7 divided by 60 gives .845, the logarithm of 7. Similarly 9 corresponds to 57.25 minutes of scale 15 and 57.25 divided by 60 gives .954, the logarithm of 9. By utilizing the scale 15 instead of the scale 6, the latter may be dispensed with, and thus allow the scales 5 and 8 to be larger for a given diameter of watch, the advantage of which will be apparent.

Figure 4:
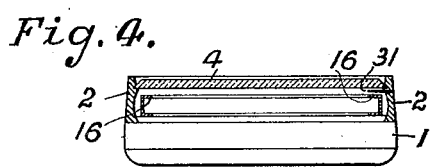
Fig. 4 is an edge view, partly in section.
Figure 5:
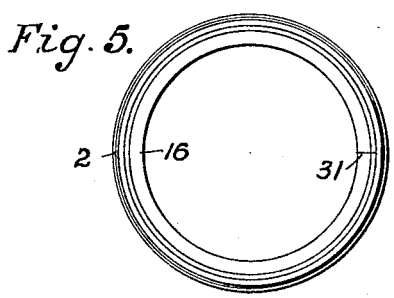
Fig. 5 is a plan view of a watch case having certain parts necessary to one embodiment of my invention applied thereto.

Referring to Figs. 4 and 5, a ring 16 may be fixed to the dial of the watch or instrument to carry the scales 5 and 6 and raise them closer up to the glass with just sufficient clearance for a pointer 31 carried by the bezel 2. The glass 4 is, in this instance, provided with a radial cursor line, by means of which in conjunction with pointer 31 distances (values) can be measured on the scale 5 and added to or subtracted from values on the latter, so that the one scale can be used for calculations, as is well known. Instead of mounting the scale 5 on the ring 16 the said scale or the scales 8 and 15, may be placed on the dial of the instrument and a lens or a flat glass utilized to avoid parallax as previously described.

Figure 6:
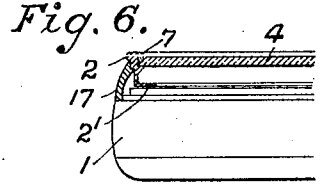
Figs. 6 and 7 show, in section, certain alternative constructions hereinafter described.
Figure 7:
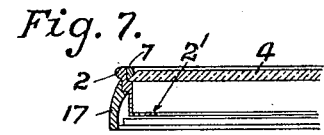

Figs. 6 and 7 show revoluble bezels 2 carried by non-revoluble bezels 17, the latter being hinged in the ordinary manner to the casing. The scales 8 and 15 in conjunction with scale 5, with or without scale 6, may be used.

Having thus described my invention, what I claim as new and desire to secure by Letters Patent is:—

1. The combination, with a measuring instrument provided with a dial and a revoluble pointer; of a revoluble bezel provided with an inwardly projecting annular shelf arranged concentric with the axis of the said pointer and marked for use as a circular slide rule, a transparent face plate supported by the bezel over the said dial and annular shelf, and a cursor device supported by the said face plate and also revoluble about the axis of the said pointer.

2. The combination, with a measuring instrument provided with a dial and a revoluble pointer; of a revoluble bezel provided with an inwardly projecting annular shelf arranged concentric with the axis of the said pointer and marked for use as a circular slide rule, and a transparent face plate carried by the said bezel and arranged over the said dial and annular shelf so that the markings of both of them may be seen through it.

3. The combination, with a measuring instrument provided with an inclosing case and having a dial and a revoluble pointer; of a revoluble bezel mounted on the case, a circular slide rule carried by the bezel and arranged concentric with the axis of the said pointer, a transparent face plate carried by the bezel and arranged over the said dial and slide rule, a finger button journaled in the said face plate and arranged concentric with the said pointer, a scale secured under the face plate concentric with the button, and a finger secured to the button and pointing to the markings of the last said scale.

In testimony whereof I affix my signature in the presence of two witnesses.

WILLIAM EASTWOOD.

Witnesses:
 HORACE WILLIAM HITCHING,
 THOMAS ARTHUR BARRETT-LENNARD.